July 11, 1950 R. J. VERHOTA 2,514,527
FISHHOOK
Filed Sept. 13, 1946
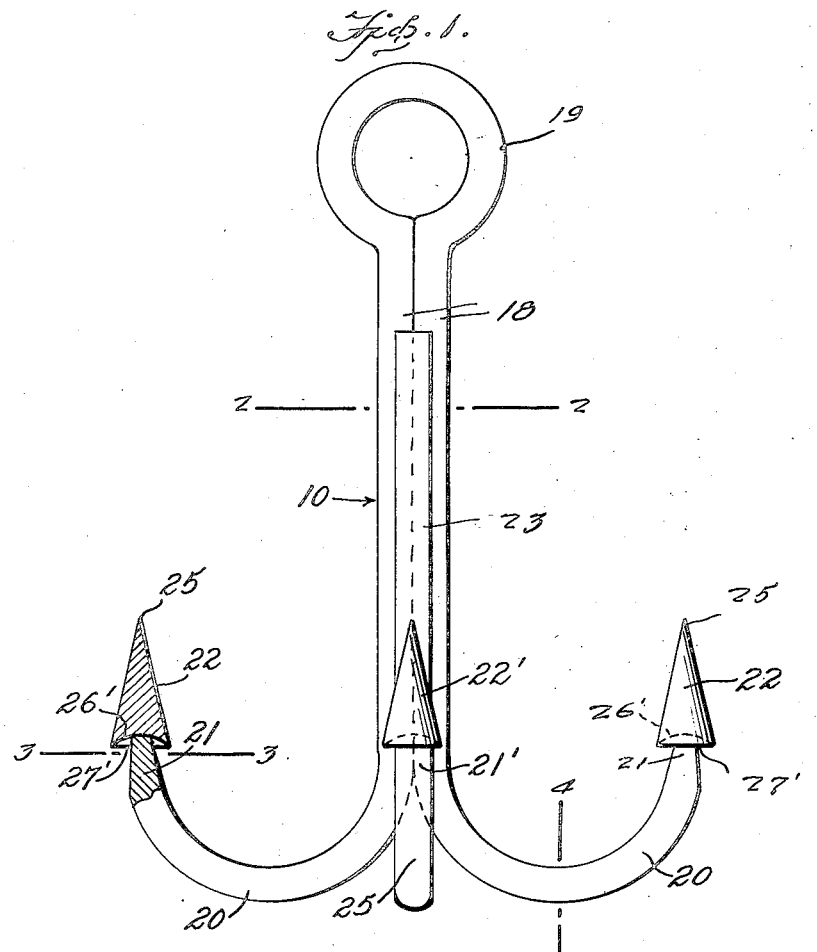
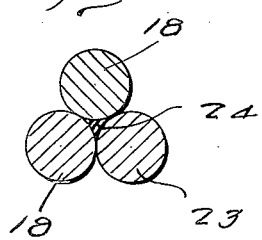
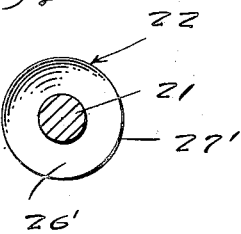
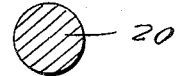
Inventor
Robert J. Verhota
By McMorrow, Berman & Davidson
Attorneys Patented July 11, 1950

2,514,527

UNITED STATES PATENT OFFICE 2,514,527

FISHHOOK

Robert J. Verhota, La Crosse, Wis.

Application September 13, 1946, Serial No. 696,683

2 Claims. (Cl. 43—44.82)

This invention relates to a fish hook, and has as its primary object the provision of an improved fish hook characterized by a barb of conical shape adapted to hold more securely a striking fish on the hook.

A further object of the invention is the provision of an improved barb per se, characterized by a conical structure having a depending, relatively sharp flange adapted to engage firmly in the fish when the fish strikes.

A further object of the invention is the provision of such a fish hook which is sturdy and durable in construction, and which may be relatively simply and inexpensively manufactured at a minimum of cost and manufacturing difficulty.

Other objects will in part be obvious and in part be pointed out as the description of the invention proceeds, and shown in the accompanying drawings wherein there is disclosed a preferred embodiment of this inventive concept.

In the drawings:

Figure 1 is a side elevation of a fish hook embodying invention, part in section.

Figure 2 is a sectional view taken substantially along the line 2—2 of Figure 1, as viewed in the direction indicated by the arrows.

Figure 3 is a sectional view taken substantially along the line 3—3 of Figure 1, as viewed in the direction indicated by the arrows.

Figure 4 is a sectional view taken along the line 4—4 of Figure 1.

Similar reference characters refer to similar parts throughout the several views of the drawings.

Referring now to the drawings, and more particularly to Figure 1, the device of the instant invention is comprised of a shank generally indicated at 10, and formed of a single wire including depending shank portions 18 formed at their upper extremities with a loop 19 adapted to be engaged by a fish line or the like. The two portions 18 diverge, as indicated at 20, to form oppositely disposed hooks which terminate in upwardly extending reduced portions 21, each surmounted by a barb, generally indicated at 22, and to be described more fully hereinafter.

A third portion of the hook comprises a complemental shank 23 adapted to be secured to the shanks 18 in any desired manner, as by welding, as indicated at 24 (see Figure 2), or the like.

The shank 23 also terminates in a looped portion 25 having an upwardly extending reduced portion 21' terminating in a conical barb 22' substantially identical to the previously mentioned barbs 22.

Referring now to the barbs 22, it will be seen that each barb 22 is substantially conical in shape and terminates in an apex 25 forming a relatively sharp point. The base of each cone is concaved, as seen at 26', and the center portion thereof is adapted to be secured in any desired manner to the reduced portion 21 of the hooks 20. Obviously, if desired, the barb 22 may be cast integrally with the hook or otherwise so formed.

The concaved portion 26' forms a relatively sharp circular flange 27' extending entirely about the reduced portion 21 and forming a sharp cutting edge adapted to engage firmly in the mouth of the fish when such fish strikes.

Obviously, due to the configuration of the barb 22, when the fish strikes, the sharp point 25 is adapted to penetrate firmly into the fish's mouth, and the further struggles of the fish will only insure the complete penetration of the barb 22 until such time as the entire barb is embedded. Further struggles to escape will merely result in the cutting of the flange 27' into the flesh of the fish, thus positively precluding escape thereof.

From the foregoing it will now be seen that there is herein provided an improved fish hook which accomplishes all the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative and not in a limiting sense.

I claim:

1. A fish hook comprising a shank including a hook portion having a tapered extremity, and a conically tapered barb secured to the free end of the tapered extremity and provided in its inner end with a concave recess forming a sharp annular edge surrounding the tapered extremity and spaced radially thereof for a substantial distance, the sharp annular edge of the barb having a diameter greater than the diameter of the shank.

2. A fish hook comprising a portion including a plurality of shanks, a plurality of circumferentially spaced generally radial hooks each secured to a shank and including a narrow tapered extremity, and conically tapered barbs secured to the free ends of the extremities and extending axially of the extremities and provided in their inner ends with concave recesses forming sharp annular edges surrounding the tapered extremities and spaced radially thereof for a substantial distance, the free ends of the tapered extremities extending to the bottoms of the concave recesses so that the sharp annular edges of the barbs are disposed axially inwardly of the free ends of the tapered extremities, the diameter of the sharp annular edges being greater than the diameter of the shanks.

ROBERT J. VERHOTA

REFERENCES CITED

The following references are of record in the file of this patent:

UNITED STATES PATENTS

| Number | Name | Date |
| --- | --- | --- |
| 38,365 | Goodrich et al. | Apr. 28, 1863 |
| 466,659 | Curtis | Jan. 5, 1892 |
| 610,184 | Hill | Sept. 6, 1898 |
| 788,201 | Friend | Apr. 25, 1905 |
| 1,171,432 | Henderson | Feb. 15, 1916 |
| 1,333,101 | Cooper | Mar. 9, 1920 |
| 2,212,345 | Krieger | Aug. 20, 1940 |
| 2,334,613 | Dunkelberger et al. | Nov. 16, 1943 |